United States Patent Office 3,284,506
Patented Nov. 8, 1966

3,284,506
METHOD OF DEPHENOLIZING CUMENE
Attilio Mantegazza, Cesare Reni, and Franco Ferré, Milan, Italy, assignors to Societá Italiana Resine S.p.A., Milan, Italy
No Drawing. Filed Dec. 20, 1962, Ser. No. 245,968
Claims priority, application Italy, Jan. 10, 1962, 1,002
2 Claims. (Cl. 260—593)

The process for producing phenol from cumene by oxidation of liquid cumene to hydroperoxide and subsequent hydrolysis of the hydroperoxide in the presence of an acid catalyst and unreacted cumene yields a decomposition product mainly comprising phenol, acetone, unreacted cumene and various side-produces.

After neutralization of the acid catalyst this mixture is generally fractionated in order to obtain, in addition to the main products (phenol and acetone), recovered cumene which is recycled to the oxidation stage.

For the sake of a satisfactory oxidation reaction it is essential for cumene to be sufficiently pure, more particularly cumene should not contain more then 100 parts per million phenol.

On the other hand, the phenol-cumene separation by rectification is very difficult, because even with a column enclosing a large number of trays it is not possible to prevent phenol from being carried along into the overhead product, even when high reflux ratios are adopted.

It is therefore generally preferred to carry out a coarse separation by rectification, which yields as overhead product cumene with a phenol content not exceeding 5%.

This cumene-phenol mixture is subsequently subjected to a purification process in order to produce cumene with a very low phenol content, such as not to adversely affect the oxidation reaction, and to recover its excess phenol.

The process which is more widely used to effect purification is based on the extraction of phenol by means of an aqueous NaOH solution; however, the phenol-phenate equilibrium conditions attained by this process are not very favourable either for a commercial operation or for satisfactory extraction. It is necessary to adopt a multistage extraction process employing NaOH quantities largely in excess (up to 100%) over the stoichiometric proportion.

The drawbacks of such process, namely high cost of installation, huge NaOH consumption and unavoidable losses of products ensuing from the multi-stage treatment, will be obvious.

A process has now been developed for purifying cumene-phenol mixtures comprising extracting the mixture by means of an aqueous NaOH solution under special temperature and pressure conditions, by which it is possible to effect with the use of a simple equipment and in an inexpensive manner a sharp separation of cumene and phenol in a single stage and with a relatively moderate excess NaOH.

The instant process yields in a single extraction stage cumene with a phenol content lower than 100 parts per million, which can therefore be directly recycled to oxidation stage; moreover, the extracted phenol can be recovered by decomposition of the sodium phenate by acidification, such as by means of sulphuric acid.

In the instant process, extraction of a coarsely rectified cumene-phenol mixture by means of an aqueous caustic soda solution is performed at a superatmospheric pressure, advantageously ranging between 1 and 10 atm. gage. Moreover, it has been found that the phenol-phenate equilibrium conditions in the mixture are improved by low temperatures, possibly not exceeding about 20° C.

The superatmospheric pressure can be established by means of any inert gas or even compressed air; no substantial difference has been found in using nitrogen or air. The use of carbon dioxide is to be avoided in view of its reactivity with caustic soda; atmospheric air containing exceptional propertions of carbon dioxide is advantageously decarbonated before use.

The extracted phenol quantity is larger as the pressure at which extraction is carried out is higher.

Even in most unfavourable cases, in which the phenol concentration in cumene is approximately 5%, a pressure of 3 to 5 kg./sq. cm. is generally sufficient to obtain in a single extraction step a cumene having a phenol content below 100 parts per million.

It is clear from the above that the instant process can be carried out with relatively inexpensive equipment, considering that a single extraction step is sufficient.

A further advantage of the improved process is operation with relatively low NaOH excess; an excess NaOH of the order of 10 to 30% is sufficient for the purpose in view.

The examples given hereafter are intended to illustrate and not to limit the scope of this invention; the percentages indicated therein should be understood by weight.

*Example 1*

The equipment employed comprises a stainless steel autoclave tested at 20 kg./sq. cm. provided with a stirrer, cooling coil, liquid charging inlet, pressure gas inlet and bottom outlet.

Coarsely rectified cumene containing 4.25% phenol and 10% NaOH solution in excess by 25% over the stoichiometric proportion are charged to the autoclave; compressed air is then admitted till a pressure of 3 kg./sq. cm. is reached, and the mixture is stirred during 15 minutes while it is maintained at a temperature of about 20° C.

Stirring is then stopped, the two layers are allowed to decant during a few minutes and the two phases are separated.

The aqueuous phase contains 99.75% of the phenol initially present in cumene, the cumene having a phenol content of less than 100 pars per million.

A similar test carried out under the same conditions as the previous one, however at atmospheric pressure and with a 100% excess NaOH, yielded an extracted phenol proportion of 85% only of the phenol content, while cumene still contained 0.62% phenol.

*Example 2*

In the equipment described in Example 1 coarsely rectified cumene containing 4.25% phenol is extracted by employing a 25% excess of a 10% NaOH solution; the same conditions are maintained as in Example 1, but pressure nitrogen is employed instead of compressed air Aqueuos soda removes 99.75% phenol, the purified cumene containing less than 100 parts per million phenol.

Example 3

The charge, conditions, details of process and time periods are the same as in Example 2, but a temperature of 11° C. is maintained.

The extracted phenol amounts to 99.90% of the total quantity, the purified cumene containing about 40 parts per million only of phenol.

Example 4

The charge, conditions, details of process and time periods are the same as in Example 1, but the pressure amounts to 5 kg./sq. cm.

The extracted phenol amounts to 99.90% of the phenol initially present, and cumene contains after extraction about 40 parts per million phenol.

What we claim is:

1. In the process for producing phenol and acetone comprising oxidizing cumene to cumene hydroperoxide, decomposing the latter to phenol and acetone in the presence of an acid catalyst and unreacted cumene, separating from the decomposition mixture a cumene fraction containing up to 5% phenol, and extracting the fraction by means of an aqueous casutic soda solution; the improvement comprising performing the extraction at a superatmospheric pressure of one to ten atmospheres gage at a temperature not exceeding 20° C.

2. In the process for producing phenol and acetone comprising oxidizing cumene to cumene hydroperoxide, decomposing the latter to phenol and acetone in the presence of an acid catalyst and unreacted cumene, separating from the decomposition mixture a cumene fraction containing up to 5% phenol, and extracting the fraction by means of an aqueous caustic soda solution; the improvement comprising performing the extraction in the presence of a pressurizing inert gas selected from a group consisting of air and nitrogen at a superatmospheric pressure of one to ten atmospheres gage at a temperature not exceeding 20° C.

References Cited by the Examiner

UNITED STATES PATENTS

| | | | |
|---|---|---|---|
| 2,597,497 | 5/1952 | Joris | 260—593 |
| 2,628,983 | 2/1953 | Aller et al. | 260—593 |

LEON ZITVER, *Primary Examiner.*

LORRAINE A. WEINBERGER, *Examiner.*

D. D. HOROWITZ, *Assistant Examiner.*